July 12, 1932.  J. H. KING  1,866,714
ROTATION TRANSMITTING MEANS
Filed April 18, 1928
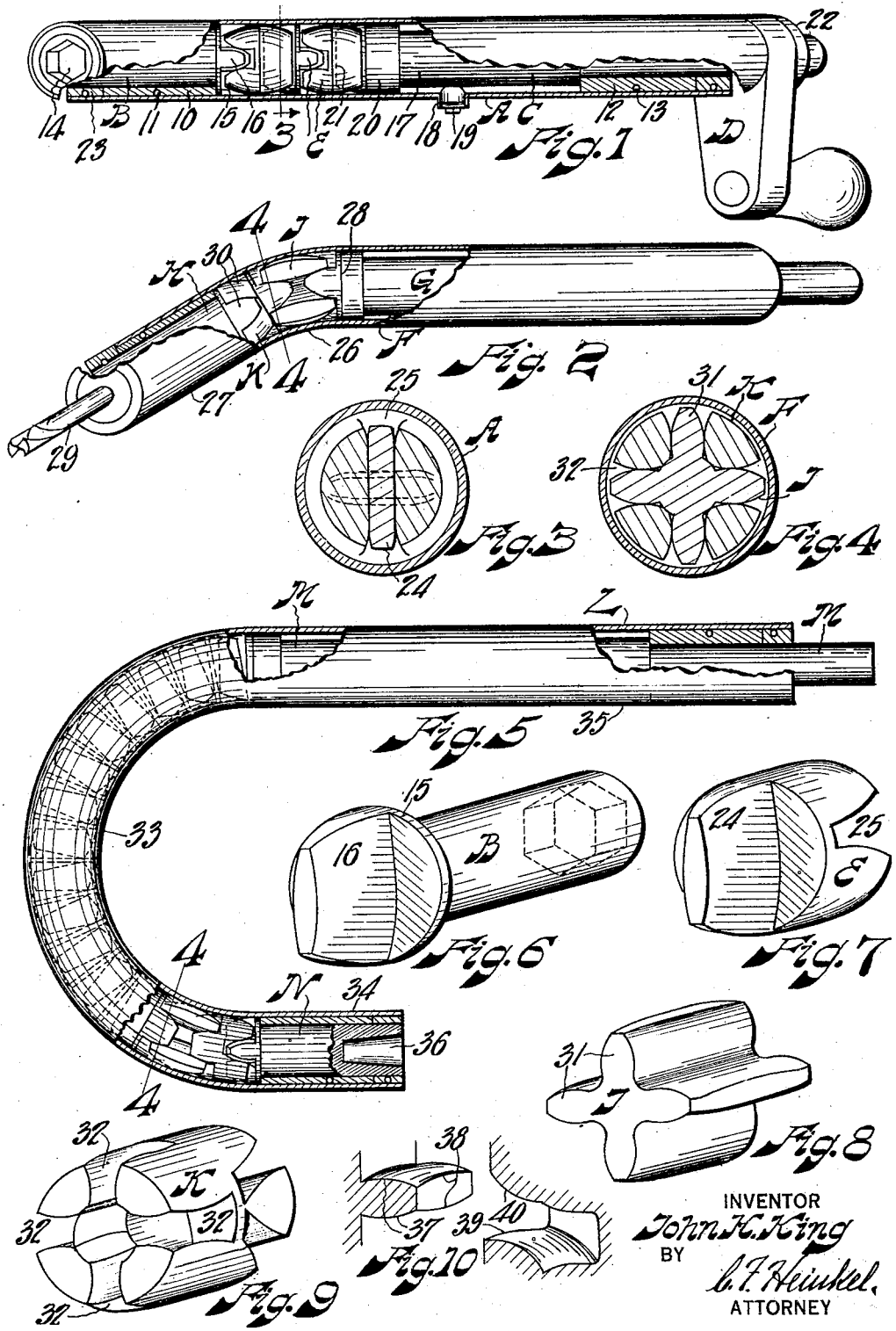

Patented July 12, 1932

1,866,714

UNITED STATES PATENT OFFICE

JOHN H. KING, OF WICKLIFFE, OHIO

ROTATION TRANSMITTING MEANS

Application filed April 18, 1928. Serial No. 270,905.

My invention relates to mechanisms wherein rotary motion is transmitted from one element or member to another.

One of the objects of my invention is to provide a simple, inexpensive, and efficient means of positively transmitting rotary motion from one element to another; to arrange and form some of the elements so that they can be used either with a straight or with an angular or with a curved or crooked housing or with driving and driven members in or out of alignment; and to form parts of some of the elements so that the same can roll on each other similar to the action between gear teeth but in more than in one rotative plane. Other objects will appear or become apparent or obvious, or will suggest themselves upon an inspection of the accompanying drawing and the herein following description of the devices shown therein.

In general practice, it is quite frequently desirable that rotative motion be transmittible from one member rotatable on a definite axis to another member rotatable on another definite axis either angular with, or in alignment, or parallel with the other axis.

In such cases it is necessary that some sort of a flexible rotation transmitting means must be interposed between the rotatable members. Flexible shafts have been used to effect straight and angular and curved drives but such shafts neither drive the members positively nor can they be used for rotation transmission purposes when the angle between the rotatable members is comparatively great; furthermore, these flexible shaft means have a very short life and are low in efficiency.

Universal joints have been used to effect straight and angular drives but such joints can not be used for rotation transmission purposes when the angle between the rotatable members exceeds certain limits.

My invention overcomes these disadvantages by providing a plurality of individual, interacting and individually movable or floatable members between two rotatable members and form them so that the same will transmit rotation easily and smoothly either on a straight axis, or on an angular axis, or on a curved axis.

Quite frequently it is desirable to reach a place quite inaccessible for usual tools, such as tightening a nut, drilling a hole, or various other operations. My invention provides a means not only to reach such inaccessible places but to convey a positive rotative motion into such places.

In order to illustrate my invention, I have selected three structures, a wrench device and a drilling device and a general utility device each embodying my invention and have shown the same in the accompanying drawing and will describe the same herein in detail but such showing and description is not intended to nor does it constitute a limitation of the application of my invention.

In the accompanying drawing mentioned above:

Fig. 1 is a perspective view of a wrench device, embodying my invention, showing a straight line drive, partly in longitudinal section to show interior relations of parts.

Fig. 2 is a perspective side view of a drilling device, embodying my invention, showing an angle drive, partly in longitudinal section to show interior relations of parts.

Fig. 3 is a transverse section of Fig. 1 taken in a plane indicated by the line 3 in Fig. 1 and shows transverse relations of parts more clearly.

Fig. 4 is a transverse section of Fig. 2 or 5 taken in a plane indicated by the line 4—4 in Figs 2 and 5 and shows transverse relations of parts.

Fig. 5 is a perspective view of a general utility device, embodying my invention, showing a disaligned parallel drive, partly in longitudinal section to show interior relations of parts.

Fig. 6 is a perspective view of the interacting driven member of Fig. 1.

Fig. 7 is a perspective view of the individual interacting blocks of Fig. 1.

Fig. 8 is a perspective view of the male individual interengaging blocks of Figs. 2 and 5.

Fig. 9 is a perspective view of the female individual interengaging blocks of Figs. 2 and 5.

Fig. 10 is a general perspective view of a tooth like projection and a groove for the same and shows one development of universal contacting surfaces between projections and grooves.

Similar reference characters refer to similar parts throughout the views pertaining to each other.

Referring now particularly to Figs. 1 and 3:

The housing is shown as a tubular member A, in this instance, a piece of straight round tube of convenient length to reach into inaccessible places.

The journal member 10 is shown as held against rotation in one end of the member A by the pin 11 and the journal member 12 is shown as held against rotation in the other end of the member A by the pin 13.

The member B, in the present instance the driven member, (Fig. 6) is shown as journaled in the journal member 10 and with the socket wrench 14 on one end thereof while the other end thereof is formed with the collar 15 and the tooth like projection 16 extending outwardly from the collar.

The member C, in the present instance the driving member, is shown with the end 17 thereof journaled in the member 12, of smaller diameter than the internal diameter of the member A to provide lubrication space fed through the header 18 and closed by the plug 19, with the bearing collar 20 fitting to the inside of the member A on the other end, and with the tooth like projection 21 extending outwardly from the collar 20 similar to the projection 16.

The outer end of the member C is shown with the handle D whereby the member C can be rotated. Other rotating means, such as a motor or other power means can be used as desired.

The collar 22 is shown pinned to the end 17 and thereby confines the member C longitudinally in the member A.

The collar 23 is shown pinned to the member B and thereby confines the member B longitudinally in the member A.

Each of the individual members E, (Fig. 7) three being shown in the present instance, is shown with a tooth like projection 24 on one end thereof and a groove 25 in the other end thereof and staggered in relation to the projection 24; both ends tapered to permit the members E to float in the member A; the adjacent teeth and grooves interacting or interengaging each other as shown; each of the members E is unattached physically to any other member and is individual and can float individually.

Referring now particularly to Figs. 2 and 4 of the drawing:

The housing is shown as a tubular member F, in this instance a piece of round tubing of convenient length, with the curved portion 26 and the portion 27 angular or out of alignment with the main portion of the member F.

The journal bearings and collars are here shown similar to the corresponding members in Fig. 1.

The driving member G is shown similar to the driving member C in Fig. 1 except that the inner end thereof has four teeth like projections 28 instead of the one projection shown on the member C.

The driven member H is shown similar to the driven member B except that the drill 29 is fixed in one end thereof and the other end thereof has four teeth like projections 30 similar to the projections 28 instead of the one projection shown on the member B.

In this instance, the individual members J and K are shown as male and female members (Figs. 8 and 9) each unattached and physically floatable as in Fig. 1.

Each of the members J has four tooth like projections or members 31 and each of the members K has four grooves 32 in each end thereof; the teeth and grooves interacting or interengaging as in Fig. 1.

Referring now particularly to Fig. 5 of the drawing:

The housing is shown as a tubular member L, in this instance a piece of tubing of convenient length, having the curved portion 33 and also having the end portion 34 parallel with the portion 35.

The journal bearings and collars are here shown similar to the corresponding members in Fig. 1.

The driving member M is shown similar to the driving member G in Fig. 2. The driven member N is shown similar to the driven member H in Fig. 2 except that the outer end thereof has the taper socket 36 to receive the shanks of various tools or other devices.

The individual members J and K are here shown similar to the corresponding members in Fig. 2.

It is understood that the housings are made of inflexible material in the devices shown and described so that one end of a device can be held in position by taking hold of any other part thereof.

Referring now particularly to Figs. 6, 7, 8, 9 and 10:

In order to insure a good universal rolling contact between the individual floatable members and the driving and driven members in radial as well as in longitudinal directions when the interacting or interengaging members are axially either in alignment or angular with each other, I form the tooth like projections and the grooves for these projections as diagrammatically illustrated in Fig. 10 where the rolling or contact surfaces of the teeth are formed with the curvature 37 axially of the member and the curvature 38 transversely of the member and according to any particular or general need required by necessary angular relations between the individual members themselves and between these members and the driving and driven members.

The surfaces 39 and 40 of the grooves are formed in a manner similar to the surfaces on the teeth with the surface 39 curved axially of the member and the surface 40 curved transversely of the member and corresponding to the same and thereby attain a smooth and steady rotative movement between the driving and driven members when the same are either in or out of alignment with each other.

With the contacting surfaces of the axially interengaging members curved axially and transversely, the members position themselves axially in the housing even when the housing is curved and transmit rotation smoothly from one member to the next one.

I am aware that my invention can be applied to devices other than those shown and described and that changes can be made in the structures of the devices shown and described as well as in the structures and arrangements of elements shown and described within the scope of the appended claims; therefore, without limiting myself to the precise application of my invention shown and described nor to the structure of the devices shown and described nor to the structure and arrangement shown and described.

I claim:

1. A rotation transmitting means including a curved tubular housing and individual axially interengaging rotation transmitting members rotatable in said housing and having the contacting surfaces thereof curved axially and transversely to form substantially spherically convex contacting surfaces for smooth transmission of rotation.

2. A rotation transmitting means including a tubular housing permanently curved and individual axially interengaging rotation transmitting members rotatable in said housing and having the contacting surfaces thereof curved axially for axial alignment of said members in said housing and curved transversely for smooth transmission of rotation between said members.

3. A rotation transmitting means including a tubular housing and individual axially interengaging male and female rotation transmitting members in said housing and having the contacting surfaces thereof curved axially and transversely of the members.

4. A rotation transmitting means including a tubular housing, a driving member rotatable in one end of said housing, a driven member rotatable in the other end of said housing, and rotation transmitting members in said housing axially interengaging among themselves and with said driving and driven members; the contact surfaces between said rotation transmitting and driving and driven members being curved axially and transversely.

5. A wrench including a tubular housing, a driving member rotatable in one end of said housing, a driven member rotatable in the other end of said housing and having a nut or bolt head engaging socket in the outer end thereof, and rotation transmitting members in said housing axially interengaging among themselves and with said driving and driven members; the contact surfaces between said rotation transmitting and driving and driven members being curved axially and transversely.

6. A drilling device including a tubular housing, a driving member rotatable in one end of said housing, a driven member rotatable in the other end of said housing and having a drill in the outer end thereof, and rotation transmitting members in said housing axially interengaging among themselves and with said driving and driven members; the contact surfaces between said rotation transmitting and driving and driven members being curved axially and transversely.

7. A device for rotating articles including a tubular housing, a driving member rotatable in one end of said housing, a driven member rotatable in the other end of said housing and having a socket in the outer end thereof for reception of shanks on articles to be rotated, and rotation transmitting members in said housing axially interengaging among themselves and with said driving and driven members; the contact surfaces between said rotation transmitting and driving and driven members being curved axially and transversely.

8. A means of the character described including a tubular member, a driving member journaled in said tubular member and having an interengaging end, a driven member journaled in said tubular member and having an interengaging end, a plurality of individual members floatingly in said tubular member and interengaging among themselves and with said interengaging ends of said driving and driven members, and said interengaging parts being formed with axially and transversely curved contact surfaces universally rollable on each other.

9. A means of the character described including a tubular member, a pair of rotatable members journaled in said tubular member out of alignment with each other and each having an interengaging part on the inner end thereof, a plurality of individual members floatingly in said tubular member and interengaging among themselves and with said interengaging ends of said driving and driven members, and said interengaging parts being formed with axially and transversely curved contact surfaces universally rollable on each other.

In testimony of the foregoing I affix my signature.

JOHN H. KING.